United States Patent [19]

Mohri et al.

[11] Patent Number: 5,301,296
[45] Date of Patent: Apr. 5, 1994

[54] MICROPROCESSOR WITH CACHE MEMORY

[75] Inventors: Atsushi Mohri; Yuuichi Saito, both of Itami, Japan

[73] Assignee: Mitsubishi Denki Kabushiki Kaisha, Tokyo, Japan

[21] Appl. No.: 716,411

[22] Filed: Jun. 17, 1991

[30] Foreign Application Priority Data

Dec. 18, 1990 [JP] Japan .................. 2-403205

[51] Int. Cl.⁵ .................. G06F 12/04; G06F 13/00
[52] U.S. Cl. .................. 395/425; 395/250; 364/956; 364/964.2; 364/253; 364/243.4
[58] Field of Search .................. 364/DIG. I MS File, 364/DIG. II MS File; 395/250, 425, 725, 800

[56] References Cited

U.S. PATENT DOCUMENTS

| | | | |
|---|---|---|---|
| 4,309,754 | 1/1982 | Dinwiddie | 364/DIG. 1 |
| 4,445,177 | 4/1984 | Bratt | 395/800 |
| 4,502,110 | 2/1985 | Saito | 364/DIG. 1 |
| 4,736,293 | 4/1988 | Patrick | 395/425 |
| 4,802,085 | 1/1989 | Levy | 395/375 |
| 4,905,188 | 2/1990 | Chuang | 395/425 |
| 4,953,073 | 8/1990 | Moussouris | 395/400 |
| 5,014,195 | 5/1991 | Farrell | 395/425 |
| 5,113,506 | 5/1992 | Moussouris | 395/400 |
| 5,119,485 | 6/1992 | Ledbetter | 395/425 |
| 5,197,144 | 3/1993 | Edenfield | 395/425 |
| 5,226,130 | 7/1993 | Favor | 395/375 |
| 5,228,134 | 7/1993 | MacWilliams | 395/425 |

OTHER PUBLICATIONS

CMOS Design for Super LSI, 1986, p. 181 FIG. 5.29.

Primary Examiner—David Y. Eng
Attorney, Agent, or Firm—Townsend and Townsend Khourie and Crew

[57] ABSTRACT

A microprocessor which has a plurality of cache memory units with plural ways, a plurality of data buses each having different bus width, and a write way control unit or an address control unit whichever capable of switching the number of ways or entries of these cache memory units in accordance with a bus mode determined by a specified data bus and accessing specific cache memory units, where by switching the number of ways or entries in accordance with the set bus mode the byte number of fetched instructions and data is brought into perfect accord with the data width (line size) of respective cache memory units during any bus mode. This in turn fully eliminates unused region of respective cache memory units to provide the improved efficiency of the use of the entire cache memory units.

9 Claims, 9 Drawing Sheets

MICROPROCESSOR WITH CACHE MEMORY

BACKGROUND OF THE INVENTION

1. Field of the Invention

The present invention relates to a microprocessor having a plurality of external buses, each having a different bus width, and also having a plurality of cache memory units with plural ways. More particularly, the invention relates to a microprocessor which fetches instructions and data destined to specific cache memory units via external buses having different bus widths by switching either the number of ways or the number of entries in accordance with the set bus mode.

2. Description of Related Art

Normally, in order to process a program including instructions and data stored in the external memory units, the conventional microprocessor needs to fetches instructions and data from these external memory units via external buses. If the speed of accessing any of these external memory units is slower than the program-processing time on the part of the microprocessor, or if it is desired to apparently accelerate the slow access speed and reduce the requirements of the microprocessor for fetching instructions and data, in many cases, the microprocessor uses the built-in cache memory units.

The cache memory unit is substantially a memory circuit composed of memory cells operating at a relatively fast speed. If the microprocessor has a certain number of built-in cache memory units for storing the fetched instructions and data, the microprocessor does not need to access the external memory from the second round of fetching instructions and data, but instead, the microprocessor can secure all the needed instructions and data merely by accessing those cache memory units. Nevertheless, when fetching instructions and data for the first time or when all the memory regions of the cache memory units are occupied creating a need to rewrite these instructions and data, then the microprocessor is obliged to fetch instructions and data from the external memory via an external bus.

In this case, those instructions and data of a specific external memory are delivered to the microprocessor by means of "block transfer". The term "block" represents a minimal unit of the divided region of the external memory storing instructions and data. Normally, a block is divided into 16 bytes quadruple to the width of the external bus or into 32 bytes. The term "block transfer" designates such an art for fetching both instructions and data of a specific external memory to the built-in cache memory units per block unit.

FIG. 1 designates the timing chart while the "block transfer" operation is underway. The reference numerals C1 through C7 respectively designate one-clock cycle. Concretely, the flowchart indicates that seven clock cycles are needed for executing the "block transfer" operation which transfers either 4 bytes or 8 bytes every clock cycle against an address.

First, when clock C1 is present, the microprocessor compares a tag with the address of a specific cache memory. Simultaneous with the output of a cache miss signal indicating the comparative result, the block transfer operation starts off. Simultaneous with the output of the cache miss signal, addresses of the instructions and data of the external memory for delivery to an external address bus are output, thus causing a bus acknowledge signal advising of the activated bus access to be fed back. Next, an operation for accessing the external memory starts off from the clock C2 in order to input bus-end signal, instructions, and data, by the time the clock C4 rises two clocks later on. Then, either the instruction or data is continuously fetched to the microprocessor by the time the following clocks C5, C6, and C7 respectively rise. Either instruction or data is set to a line buffer by continuously accessing memory four times, and then either instruction or data is written into these cache memory units while the clock C7 cycle is underway. In this way, if the external bus has 4 byte width while executing the block transfer operation, then 16 bytes are fetched. On the other hand, if the external bus has 8 byte width, then 32 bytes are fetched.

FIG. 2 designates a schematic block diagram of a conventional microprocessor having a plurality of external buses each having different bus width and a pair of built-in cache memory units. The reference numeral 11 shown in FIG. 2 designates a microprocessor which has a pair of two-way cache memory units 12a and 12b each having 32 bytes of line size. These cache memory units 12a and 12b are respectively composed of a tag region storing the upper 24 bit tag of 30-bit address signal and a 16-byte data storing region storing either instructions or data held in specific addresses of an external memory 40 specified by address signal. When the 4-byte byte bus mode is underway, these cache memory units 12a, 12b operate in the two-way set associative form, in which cache memory units 12a, 12b are respectively accessed by applying an identical entry number.

The microprocessor 11 fetches instructions and data of a specific external memory (not shown) via an external bus 8 or 9 having either 4-byte or 8-byte width. The external bus 8 is connected to the upper 4-byte data bus 10a of an internal data bus 10 having 8-byte width, whereas the other external bus 9 is connected to the upper 4-byte data bus 10a and also to the other lower 4-byte data bus 10b, respectively. The upper 4-byte data bus 10a of the internal data bus 10 is connected to a line buffer 13 having 32-byte width via a route 14, whereas the lower 4-byte data bus 10b of the internal data bus 10 is also connected to the line buffer 13 via a route 15. The line buffer 13 has a line size which is identical to those of the cache memory units 12a and 12b, where the line buffer 13 sets 4-byte or 8-byte instructions or data by the number of bytes available for executing the block transfer. The line buffer 13 separately writes the fetched 16-byte instructions and data into those cache memory units 12a and 12b via routes 16a and 16b. The line buffer 13 also separately writes the 32-byte instructions and data into these cache memory units 12a and 12b via routes 17a and 17b.

Next, functional operation of this conventional microprocessor when fetching instructions and data into builtin cache memory units 12a and 12b is described. The description below refers to the case in which both the instructions and data are respectively fetched from the 8-byte external bus 9 for example (this is hereinafter called the 8-byte bus mode).

When a cache miss signal is output from a tag comparator (not shown) of the cache memory units 12a and 12b, the sequence of the block transfer starts. While the block transfer operation is underway, those instructions and data of an external memory are respectively delivered from the external bus 9 having 8-byte width to the upper 4-byte data bus 10a and to the lower 4-byte data bus 10b of the internal data bus 10, respectively. After arriving at the internal data bus 10, the 8-byte instructions and data are delivered to the line buffer 13 via the routes 14 and 15. By applying the block transfer operation, of 32 bytes quadruple to 8 bytes these instructions and data in 4 clock cycles are secured in the line buffer 13 while the 4th clock cycle is underway. These instructions and data are then registered in the data storing region of an entry 12, for example, of the way 0 cache memory unit 12a or in the data storing region of an entry 12, for example, of the way 1 cache memory unit 12b via the route 17a or 17b. Since 32 bytes of instructions and data are registered every round of the block transfer operation, the line size of one-way of these cache memory units 12a and 12b corresponds to 32 bytes. Since every data is independent, tag B of the entry 12 of the way 0 and tag D of the entry 12 of the way 1 are respectively registered in specific values which are different from each other. The cache memory units having the above structure are operated in the two-way set associative form based on the 8-byte bus mode.

Next, functional operation of the microprocessor when fetching instructions and data from an external 4-byte bus 8 is described below (this is hereinafter called the 4-byte bus mode). While the block transfer operation is underway, those instructions and data of the external memory are transmitted from the external bus 8 having 4-byte bus width solely to the upper 4-byte data bus 10a of the internal data bus 10. As was done during the 8-byte bus mode, when fetching instructions and data every round of the block transfer operation, those instructions and data of 16-byte quadruple to the upper 4-byte data bus 10a of the internal data bus 10 are secured in the line buffer 13 via the route 14. In this case, the line buffer 13 does not need to accommodate 32 bytes, but instead, it merely uses 16 bytes. Concretely, the 16 byte portions shown in FIG. 2 with slash lines remain unused in the external 4-byte bus route. Those instructions and data are registered in the data storing region of the entry 10, for example, of the way 0 cache memory unit 12a, for example, or in the data storing region of the entry 10, for example, of the way 1 cache memory unit 12b via the route 16a or 16b. Since the receivable instructions and data are of 16 bytes, the line size of the cache memory units 12a and 12b does not need to accommodate 32 bytes, but it merely uses 16 bytes. Likewise, the 16 byte portions shown in FIG. 2 with slash lines are not needed when the 4-byte bus mode is underway. Since each data is independent, tag A of the entry 10 of the way 0 and tag C of the entry 10 of the way 1 are respectively registered in specific values which are different from each other.

When using all the line sizes of 32 bytes while the 4-byte bus mode is underway, the microprocessor needs to execute the block transfer operations twice. In other words, by fetching the 16 byte instructions and data twice, these are written into all the 32-byte line size. This in turn indicates that are longer time is needed for fetching these instructions and data relative to execution of an additional block transfer operation. As is done while the 8-byte bus mode is underway, even when the 4-byte bus mode is on, any conventional microprocessor operates itself in the two-way set associative form.

As mentioned above, any conventional microprocessor which has a plurality of external buses needs to adjust the line size of cache memory units to a certain value quadruple to the wide bus width (like 8 bytes for example) of the external bus when fetching instructions and data to the cache memory units by applying the block transfer operation, and when fetching instructions and data from another external bus having narrow bus width, a certain region of each cache memory unit remains unused. This in turn generates useless space in each memory unit, and yet, obliges the entire system to execute plural cycles of the block transfer operation, thus causing the system to extend the duration of the block transfer operation.

SUMMARY OF THE INVENTION

The invention to fully solves those disadvantages inherent in the conventional microprocessors. The primary object of the invention is to provide a novel microprocessor which fully eliminates unused portions of the built-in cache memory units. Each cache unit supports a plurality of external bus widths based on switching the number of ways or the number of entries in correspondence with the entered bus mode when fetching instructions and data from any of the external memory units. By applying a single round of the block transfer operation, the efficiency in the use of data storing regions in these cache memory units can fully be promoted, and yet, instructions and data can be transmitted at high speed by applying a single round of the block transfer operation.

According to the invention, the data width (line size) of each cache memory unit is variable by switching the number of ways say of cache memory units in correspondence with the variation of the number of bytes of instructions and data which are switchable by bus mode by means of adjusting the data width to a certain value corresponding to four times the narrow bus width. For example, by adjusting the data width (line size) to the number of bytes of instructions or data which can be fetched by executing a single round of the block transfer operation.

In consequence, the write data width (line size) of each cache memory unit correctly matches the number of bytes of instructions and data in such a bus mode for fetching these instructions and data of the external memory from a specific data bus having wide bus width and also in such a bus mode for fetching these instructions and data from a specific data bus having narrow bus width. By virtue of the above arrangement, unused portions of each cache memory unit are fully eliminated, and yet, the block transfer operation can be completed merely by executing it once for fetching instructions and data. According to the invention, the data width (line size) can be properly switched merely by switching the number of the entries of each cache memory unit in accordance with the set bus mode. Like the above, the byte number of instructions and data correctly matches the line size of each cache memory unit.

The above and further objects and features of the invention will more fully be apparent from the following detailed description with accompanying drawings.

DESCRIPTION OF THE PREFERRED EMBODIMENTS

Referring now more particularly to the accompanying drawings, embodiments of the invention are described below.

Figure 1:
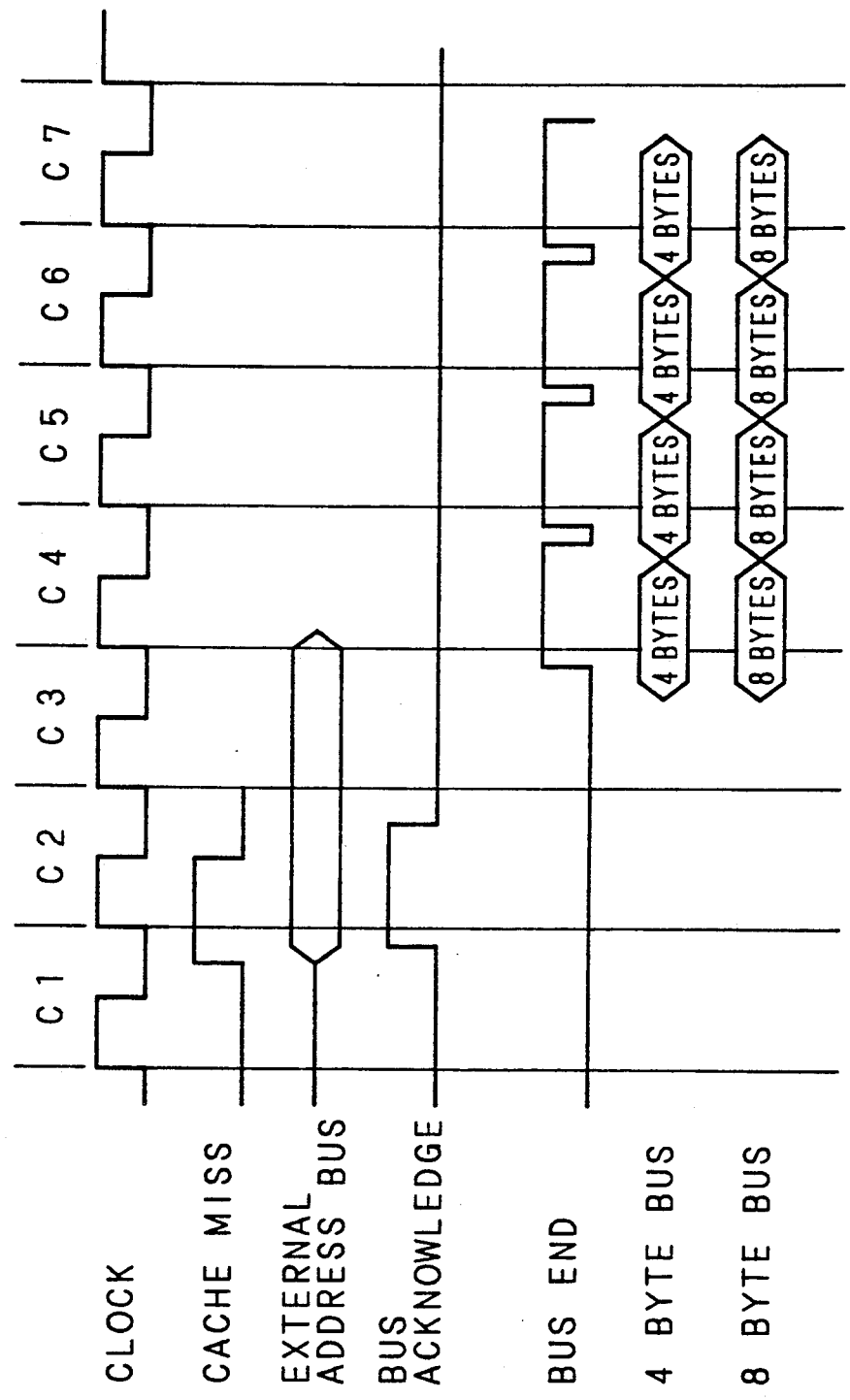
FIG. 1 designates a timing chart related to the block transfer operation of a conventional microprocessor.
Figure 2:
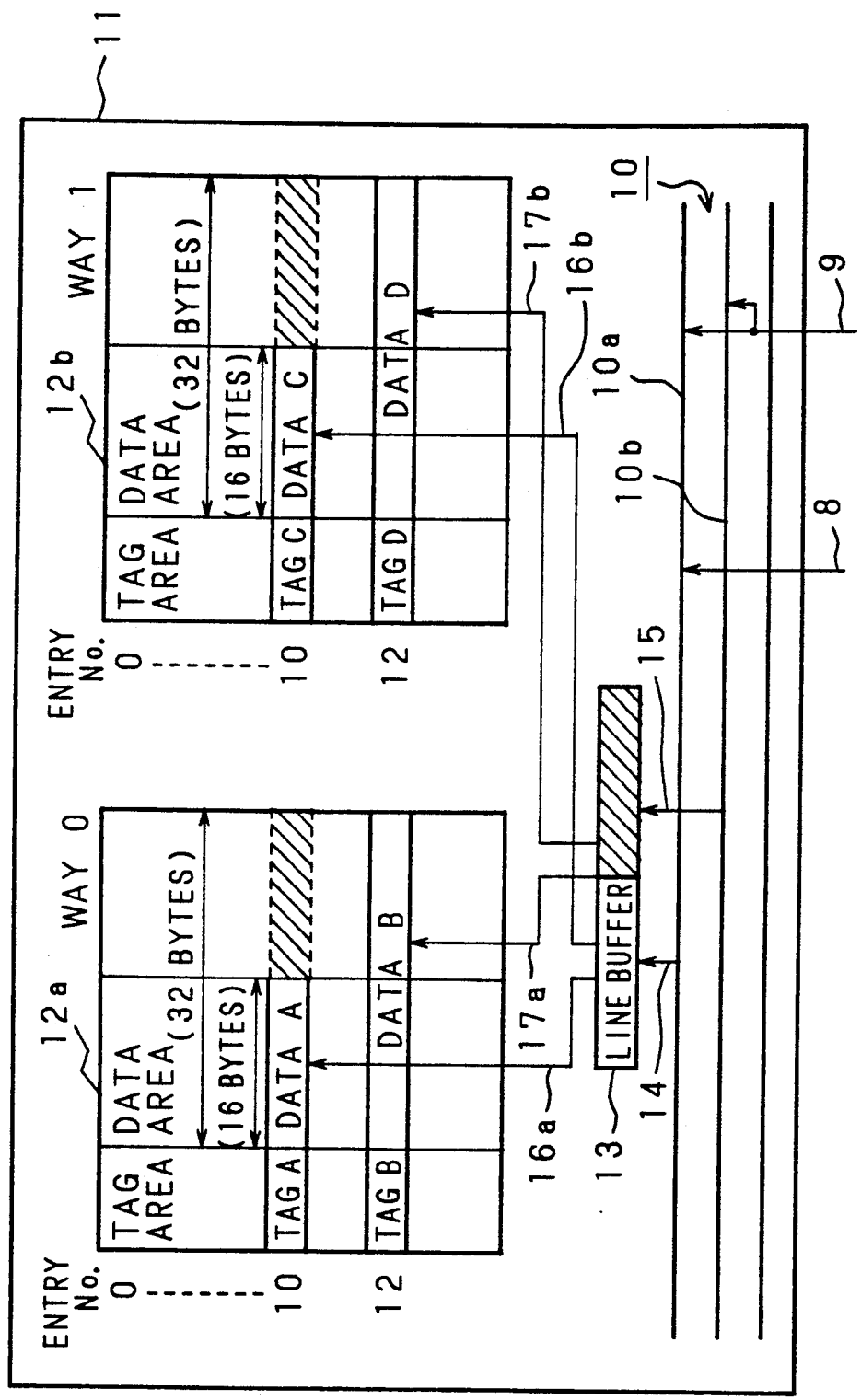
FIG. 2 schematically designates a block diagram of a conventional microprocessor.
Figure 3:
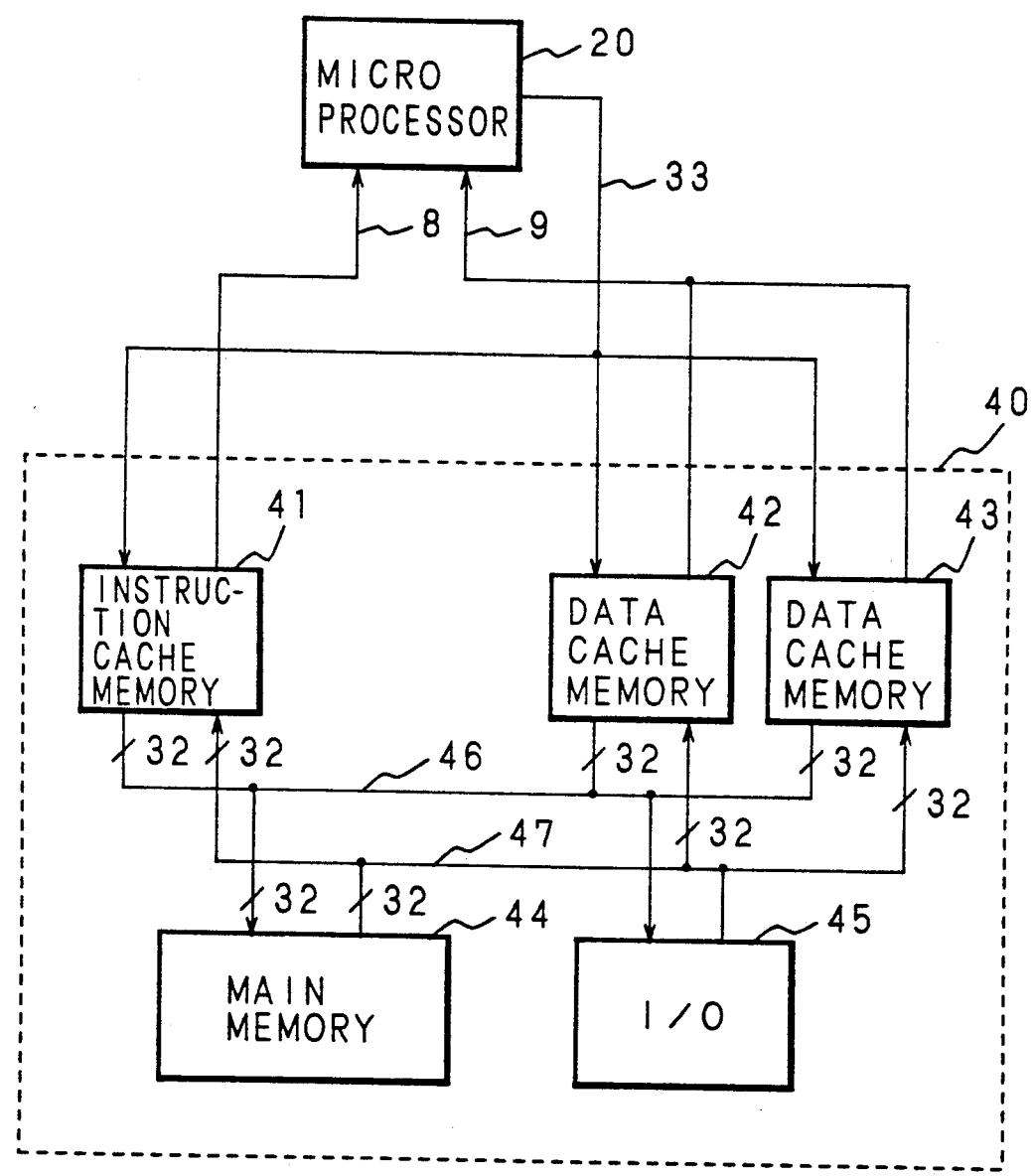
FIG. 3 designates an example of the block diagram of a memory system using the microprocessor embodied by the invention.

According to an embodiment of the invention shown in FIG. 3, a microprocessor 20 is connected to an external memory 40, an external bus 8 having 4-byte bus width, another external bus 9 having 8-byte bus width, and an address bus 33 having 4-byte bus width, respectively. The external memory 40 is composed of an instruction cache memory unit 41 which is connected to the microprocessor 20 via the external bus 8, a pair of data cache memory units 42 and 43 which are connected to the microprocessor 20 via the external bus 9, a main memory unit 44 which is connected to the instruction cache memory unit 41 and the data cache memory units 42 and 43 via an address bus 46 and an external data bus 47, and an input/output port 45, respectively. The instruction cache memory unit 41 outputs addresses to the main memory unit 44 via the address bus 46 and receives a 4-byte instruction from the corresponding address of the main memory unit 44 or from that of the input/output port 45 via the external data bus 47. The system shown in FIG. 3 can fetch instructions and data into the built-in cache memory units via discrete external buses 8 and 9 by applying the instruction cache memory unit 41 and a pair of the data cache memory units 42 and 43 (serving as the secondary cache memory units) disposed inside of the external memory 40 and also by means of the own built-in cache memory units mentioned above. In other words, since the system shown in FIG. 3 can fetch both instructions and data based on parallel process routine, the system can perform extremely fast data processing operations.

Figure 4:
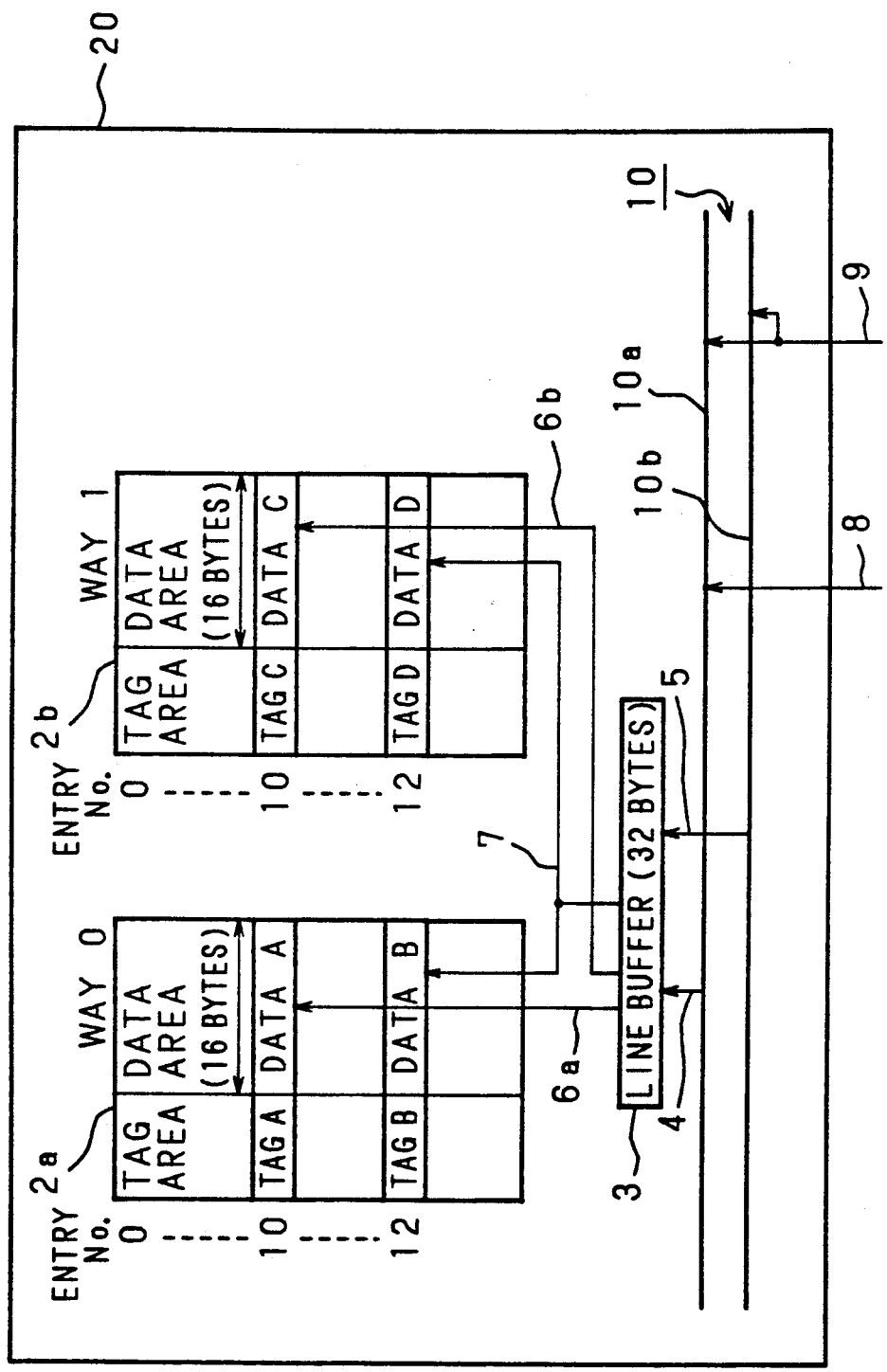
FIG. 4 designates a concrete block diagram of the microprocessor embodied by the invention.

FIG. 4 schematically designates a block diagram of the cache memory units and peripheral circuits built in the microprocessor according to an embodiment of the invention. The reference numeral 20 shown in FIG. 4 designates the microprocessor embodied by the invention. The microprocessor 20 has a pair of cache memory units 2a and 2b which are aligned in two ways and provided with 16 bytes of the data width (line size), respectively. Each of the cache memory units 2a and 2b is composed of a tag region for storing the upper several bits tag of 32-bit address signal and a data storing region for storing instructions and/or data in specific addresses of the external memory 40 specified by address signal. These cache memory units 2a and 2b are respectively operated based on the two-way set associative form in which these cache memory units are accessed by applying an identical entry number while the 4-byte bus mode is underway. The microprocessor 20 receives instructions and data of the external memory 40 via the external bus 8 or 9 having 4 or 8 bytes of width. The external bus 8 is connected to the upper 4-byte data bus 10a of the internal data bus 10 having 8 bytes of width, whereas the external bus 9 is connected to the upper 4-byte data bus 10a and lower 4-byte data bus 10b, respectively.

The upper 4-byte data bus 10a of the internal data bus 10 is connected to a line buffer 3 having 32 bytes of width, in other words, having 32 bytes of line size, via the route 4. The lower 4-byte data bus 10b of the internal data bus 10 is connected to the line buffer 3 via the route 5. The line buffer 3 is provided with a specific bus width identical to that of the internal data bus 10, where the line buffer 3 sets 4 or 8-byte instructions and data given to the internal data bus 10 by the number of bytes corresponding to the amount of the block transfer. The line buffer 3 discretely writes the fetched instructions and data into the cache memory units 2a and 2b via the routes 6a, 6b, or 7.

Next, functional operation of the microprocessor 20 for fetching instructions and data into the built-in cache memory units 2a and 2b is described below. First, sequential operations of the microprocessor 20 for fetching instructions and data of the external memory 40 into the built-in cache memory units 2a and 2b based on the 40-byte bus mode is described below.

When cache miss signal is output from a tag comparator (not shown) of either the cache memory unit 2a or 2b, the block transfer sequence starts. When the block transfer operation is underway, instructions and data of the external memory 40 are solely transmitted from the external bus 8 having 4 byte width to the upper 4-byte data bus 10a of the internal data bus 10. The 4-byte instructions and data delivered to the upper 4-byte data bus 10a of the internal data bus 10 are then transmitted to the line buffer 3 via the route 4. By applying the block transfer operation, these 16 byte instructions and data are then secured in the line buffer 3. Next, the fetched 16-byte instructions and data are respectively registered at one time via the route 6a or 6b either in the data storing region of the entry 10 for example of the cache memory unit 2a of for example the selected way 0 or in the data storing region of the entry 12 of the cache memory unit 2b of the selected way 1. Since data A of the entry 10 and data D of the entry 12 are respectively independent, values of the registered entries 10 and 12 for example of these data A and D and values of the tags A and D are different from each other. In this way, when the 4-byte bus mode is underway, these cache memory units 2a and 2b operate in the two-way set associative form.

Next, functional operation of the microprocessor 20 for fetching instructions and data of the external memory 40 to the built-in cache memory units 2a and 2b under the 8-byte bus mode is described below.

While the block transfer operation is underway, those instructions and data of the external memory 40 are transmitted to the upper 4-byte data bus 10a and the lower 4-byte data bus 10b of the internal data bus 10 from the external bus 9 having 8-byte width. These 8-byte instructions and data received by the internal data bus 10 are then transmitted to the line buffer 3 via the routes 4 and 5. Next, those 32 byte instructions and data are respectively secured in the line buffer 3 by applying the block transfer operation. Then, the delivered instructions and data are respectively registered in the data storing region of the entry 12 for example of the cache memory unit 2a of the way 0 and also in the data storing region of the entry 12 for example of the cache memory unit 2b of the way 1, in other word, the delivered instructions and data are registered in the identical entry number. In this case, since data B of the cache memory unit 2a and data D of the cache memory unit 2b substantially make up such instructions and data containing continuous addresses, and thus, tags B and D corresponding to these data B and D are equal to each other. In this way, when the 8-byte bus mode is underway, those cache memory units 2a and 2b respectively function themselves as "direct mapping" units.

In contrast with the 4-byte bus mode in which those cache memory units 2a and 2b are conjunctionally operated on the two-way basis by applying 16 bytes of data width (line size), when the 8-byte bus mode is underway, these cache memory units 2a and 2b are operated on the one-way basis by applying 32 bytes of data width (line size), respectively.

The above are descriptions explanatory of the switching operation between the two-way set associative form and the direct mapping form in accordance with the 4-byte and 8-byte bus widths.

The following description refers to functional operation of the microprocessor embodied by the invention for selectively switching the 4-way set associative form and the two-way set associative form in accordance with the 4 and 8 byte bus widths according to the second embodiment of the invention.

Figure 5:
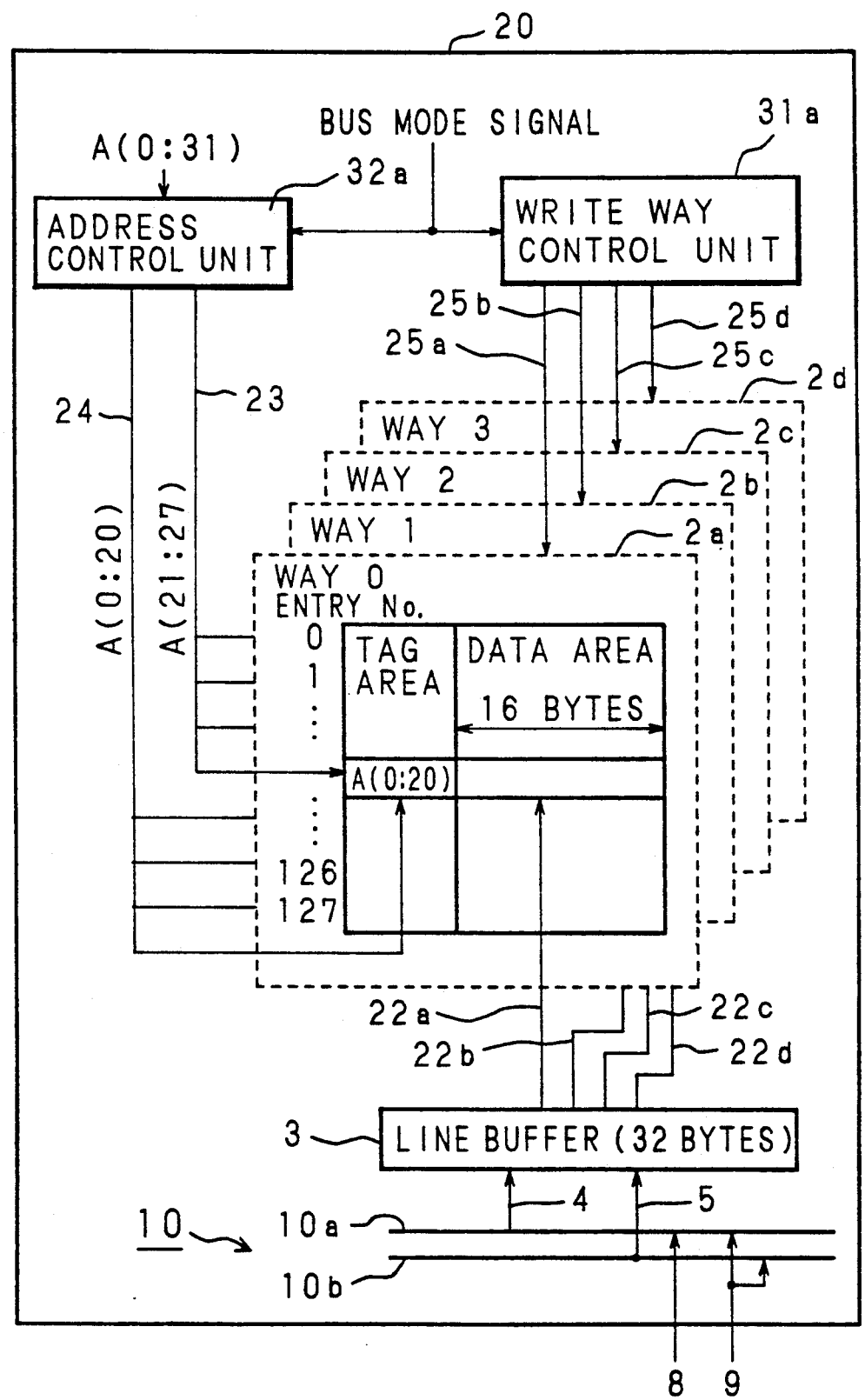
FIG. 5 designates another concrete block diagram of the microprocessor according to the second embodiment of the invention.
Figure 6:
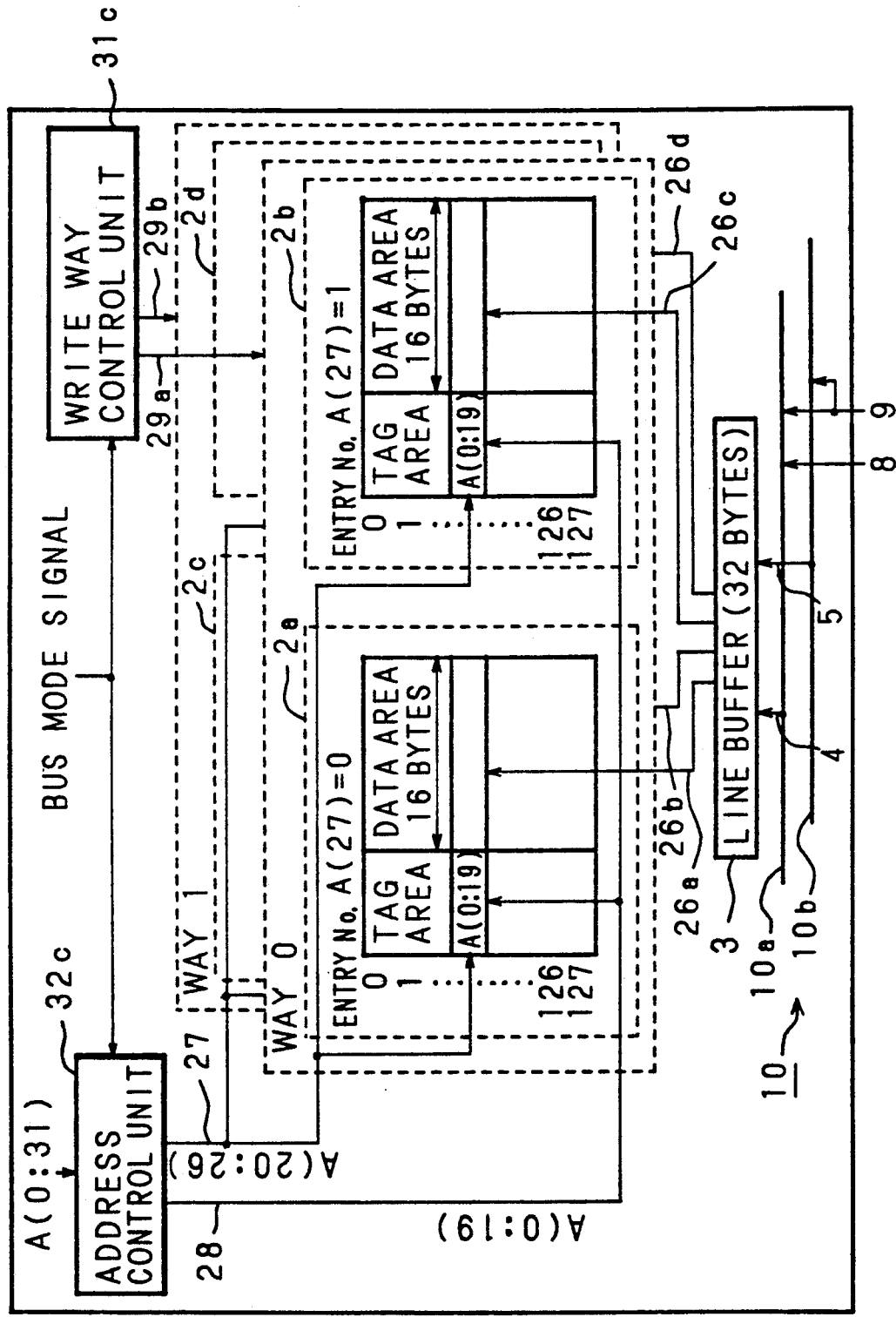
FIG. 6 designates a further concrete block diagram of the microprocessor according to the second embodiment of the invention.

FIG. 5 schematically designates the block diagram of the microprocessor according to the second embodiment of the invention when operating under the 4-byte bus mode. FIG. 6 schematically designates the block diagram of the microprocessor according to the second embodiment of the invention when operating under the 8-byte bus mode.

The reference numeral 20 shown in FIG. 5 designates a microprocessor which is connected to an external bus 8 having 4-byte width and another external bus 9 having 8-byte width, where the microprocessor 20 has built-in four-way cache memory units 2a through 2d each consisting of an integral set of tag and data storing regions. Available entry for writing data into these 0 through 3 way cache memory units 2a through 2d is selected by an address select signal 23 which decodes 7-bit address A (21:27) of the 21st through 27th bits among those 32-bit address A (0:31) delivered to an address control unit 32a. When writing data into those cache memory units 2a through 2d, any of those four ways 0 through 3 is selected by way-select signals 25a through 25d output from a write way control unit 31a, where any of those four-way cache memory units 2a through 2d is selected by any of these way select signals 25a through 25d. The lower 21-bit address A (0:20) of the address A (0:31) is registered in the tag region of any of these cache memory units 2a through 2d, where the available way is selected by the write way control unit 31a via the route 24. The reference numerals 22a through 22d respectively designate routes which are available for writing 16-byte instructions and data output from a line buffer 3 into those cache memory units 2a through 2d. A bus mode signal specifying the bus mode is transmitted to the address control unit 32a and the write way control unit 31a so that both control units 31a and 32a can be activated.

The cache memory units 2a and 2b shown in FIG. 6 respectively make up way "0" consisting of a tag region and a data storing region. When the 8-byte bus mode is underway, a pair of cache memory units 2a and 2b and another pair of cache memory units 2c and 2d respectively make up one way component.

When writing data into those cache memory units 2a and 2b or 2c and 2d, available entry is selected by an address select signal 27 which decodes 7-bit address A (20:26) of the 20th through 26th bits of 32-bit address A (0:31) delivered to the address control unit 32b. When writing data into those cache memory units 2a and 2b or 2c and 2d, either the way "0" or the way "1" is selected by either a way select signal 29a or 29b output from the write way control unit 31b, and then either a pair of cache memory units 2a and 2b or another pair of cache memory units 2c and 2d belonging to either of these two ways is selected. The lower 20-bit address (0:19) of the address A (0:31) is registered via the route 28 in the tag region of the cache memory units 2a and 2b or 2c and 2d whichever the way selected by the write way control unit 31b. The reference numerals 26a and 26b respectively designate routes which are available for writing 32-byte instructions and data output from the line buffer 3 into those cache memory units 2a and 2b or 2c and 2d. All the other structural details are identical to those of the preceding embodiment shown in FIG. 4, and thus description of these is deleted here.

Figure 7:
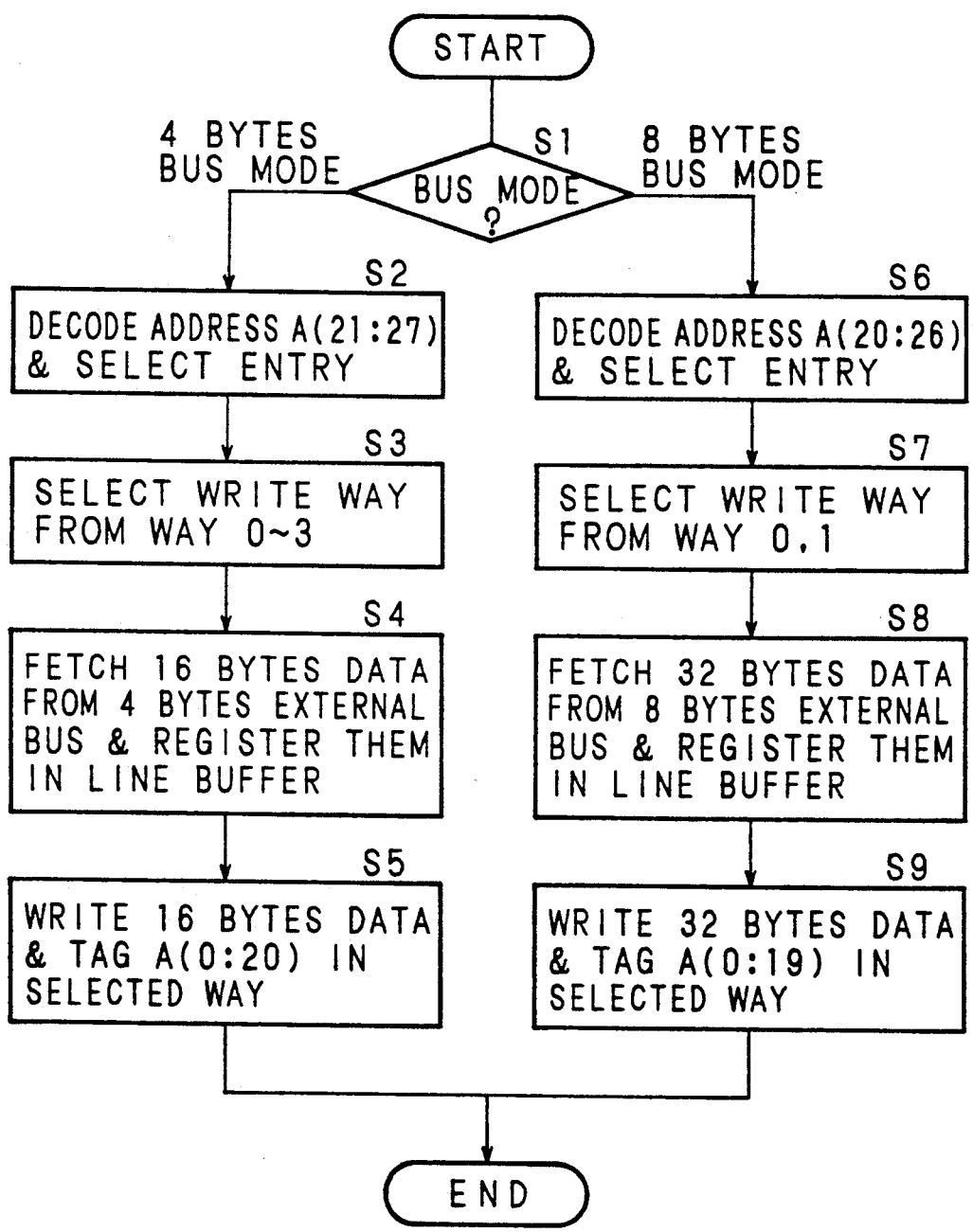
FIG. 7 designates a flowchart describing sequential operation of the microprocessor of the second embodiment when fetching instructions and data into built-in cache memory units.

Next, the sequence of operations of the microprocessor for fetching instructions and data into the cache memory units according to the second embodiment of the invention is described below. FIG. 7 designates a flowchart explanatory of the operation of the microprocessor for fetching instructions and data into the cache memory units according to the second embodiment of the invention.

First, functional step S1 is activated, in which the microprocessor checks to see if the set bus mode corresponds to either the 4-byte bus mode or the 8-byte bus mode. If the 4-byte bus mode shown in FIG. 5 is activated for transmitting instructions and data to the cache memory units 2a through 2d, then the microprocessor decodes address A (21:27) in the following step S2 to permit an entry select signal 23 to be output. Next, step S3 is activated, in which the microprocessor selects a write way from those four ways 0 through 3 in accordance with the way select signals 25a through 25d whichever output from the write way control unit 31a in response to the activated bus mode. When the block transfer operation is underway, the external bus 8 having 4-byte bus width outputs instructions and data of the external memory 40 for transmission to the upper 4-byte data bus 10a of the internal data bus 10. Next, those 4-byte instructions and data transmitted to the internal data bus 10 are delivered to the line buffer 3 via the route 4, and then, by applying the block transfer, 16-byte instructions and data are respectively secured in the line buffer 3 during the following step S4. Since the byte number of the delivered instructions and data correctly matches the line size of each way, those cache memory units 2a through 2d respectively operate themselves based on the 4-way set associative form. Next, step S5 is activated, in which the 16-byte instructions and data delivered to the line buffer 3 are output to those ways 0 through 3 of the cache memory units 2a through 2d via the routes 22a through 22d, and then these 16-byte instructions and data are written into a specific entry (selected by entry select signal 23) belonging to a specific way selected by any of those select signals 25a through 25d available for selecting those ways 0 through 3.

When transmitting instructions and data to the cache memory units under the 8-byte bus mode shown in FIG. 6, step S6 is activated, in which the microprocessor 20 decodes address A (20:26) and then outputs an entry select signal 27. Next, step S7 is activated, in which the microprocessor 20 selects a specific write way from either way 0 or way 1 in response to the way select signals 29a or 29b output from the write way control unit 31b in accordance with the activated bus mode. While the block transfer operation is underway, those instructions and data of the external memory 40 are respectively transmitted from the external bus 9 having 8-byte width to the upper 4-byte data bus 10a and the lower 4-byte data bus 10b of the internal data bus 10. In the course of the functional step S8, the 8-byte instructions and data transmitted to the internal data bus 10 are then delivered to the line buffer 3 via the routes 4 and 5, and then, by applying the block transfer, 32-byte instructions and data are respectively secured in the line buffer 3. Since the cache memory units 2a through 2d respectively contain 16 bytes of the data width (line size), a pair of cache memory units 2a and 2b or another pair of cache memory units 2c and 2d makes up either of the way 0 or the way 1, where these cache memory units operate themselves based on the two-way set associative form.

Next, step S9 is activated, in which the 32-byte instructions and data delivered to the line buffer 3 are output to those ways 0 and 1 of respective cache memory units 2a through 2d via the routes 26a and 26b, and then these instructions and data are written into a specific entry selected by the entry select signal 27 belonging to either of the way 0 or the way 1 selected by either the select signal 29a or 29b of each way.

Since these cache memory units 2a through 2d operate based on 16 bytes of the data width (line size) in four ways under the 4bytes bus mode, and yet, since these cache memory units operate based on 32 bytes of data width (line size) in two ways when the 8-byte bus mode is underway, the system needs to activate operations of the 4-way write way control unit 31a which separately outputs a way select signal 25 and another way select signal 29 when writing instructions and data into the cache memory units 2a through 2d along with the 2-way write way control unit 31b. Normally, these write way control units 31a and 31b are prepared by applying such algorithm as LRU algorithm or FIFO algorithm. As mentioned above, all the cache memory units 2a through 2d are fully operated by operating such a microprocessor containing both the 4 byte and 8-byte bus modes based on 16 bytes of data width (line size) in four ways under the 4-byte bus mode and 32 bytes of line size in 2 ways under the 8-byte bus mode, thus promoting the efficiency in the use of the data storing regions of respective cache memory units.

According to the invention, when fetching instructions and data from an external bus having narrow bus width or from another external bus having wide bus width while operating the microprocessor containing these external buses having different bus width and plural ways, the byte number for fetching instructions and data correctly matches the write line size of these cache memory units. Thus the above system can effectively be applied to all microprocessors having the structure capable of switching the number of ways of cache memory units. This system is also applicable to a microprocessor which operate based on 16 bytes of data width (line size) in 8 ways under the 4-byte bus mode and 32 bytes of data width (line size) in 4 ways under the 8-byte bus mode.

Next, another embodiment of the microprocessor related to the invention is described which is capable of executing the below described operations: When fetching instructions and data based on different bus modes, in order to coincide the byte number of receivable instructions and data with the write line size of cache memory units, the number of entries can be switched without varying the number of ways of the cache memory units. Concretely, the microprocessor according to this embodiment of the invention has a plurality of built-in cache memory units each containing 4 and 8 byte bus modes and four ways, where the microprocessor operates based on 256 entries using two ways under the 4-byte bus mode and 128 entries using two ways under the 8-byte bus mode, respectively.

Figure 8:
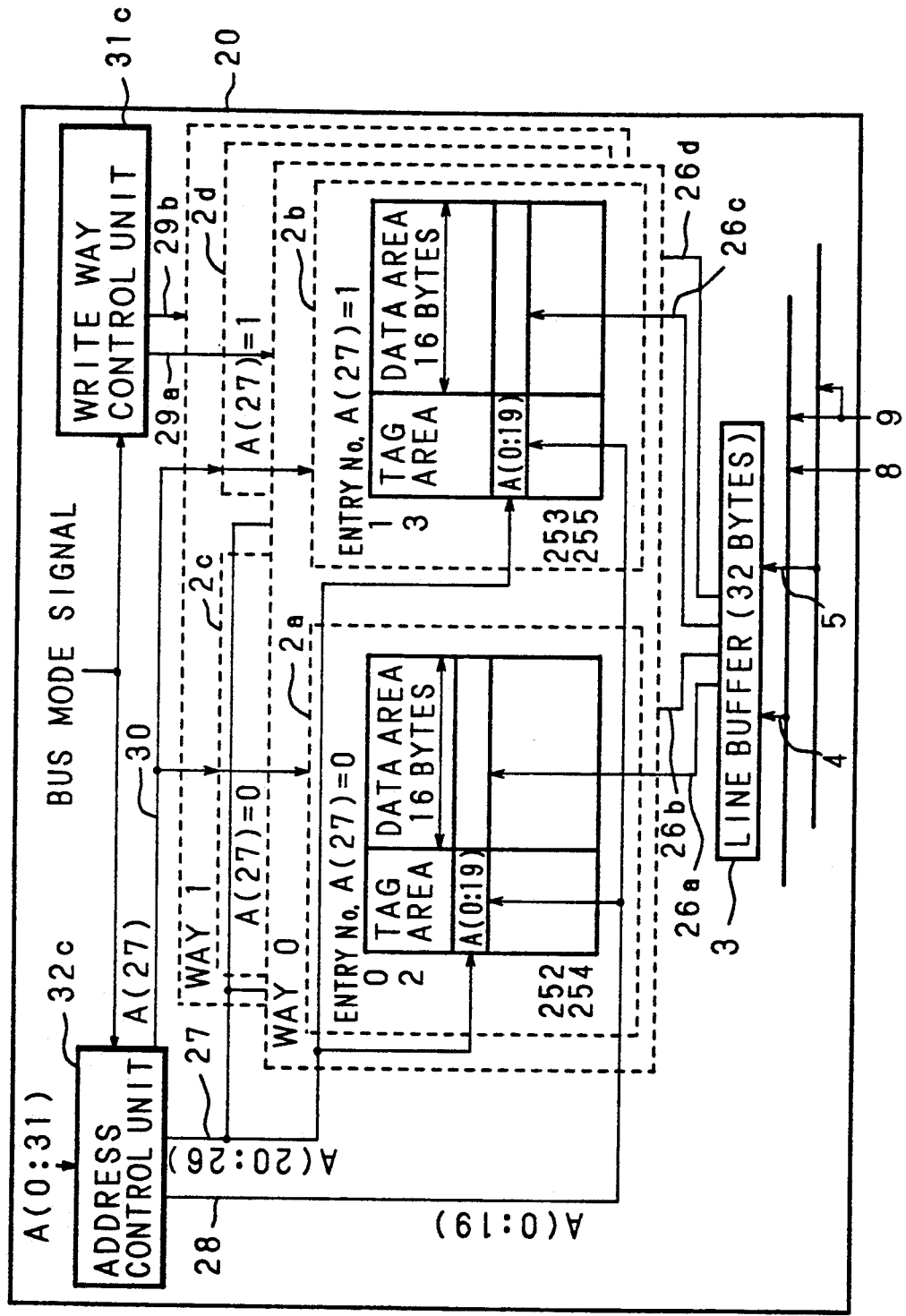
FIG. 8 schematically designates a block diagram of the microprocessor according to a still further embodiment of the invention.

FIG. 8 designates the block diagram of the microprocessor under the 4-byte bus mode according to a still further embodiment of the invention. The structure and functional operation of the microprocessor under the 8-byte bus mode have already been described with reference to FIG. 6, and thus, description of these is deleted here.

The reference numeral 20 shown in FIG. 8, like the one shown in FIG. 5 and FIG. 6, designates the microprocessor of the invention having 4 of built-in cache memory units 2a through 2d each containing 4 and 8 byte buses and consisting of a tag region and a data storing region. The microprocessor 20 operates itself based on 16 bytes of the data width (line size) using two ways under the 4-byte bus mode and 32 bytes of the data width (line size) using two ways under the 8-byte bus mode.

The reference numeral 30 designates select signal which identifies the 27th bit address A(27) delivered to an address control unit 32c. The select signal 30 selects the cache memory units 2a and 2c whenever the address A(27) remains "0", whereas it selects the cache memory units 2b and 2d whenever the address A(27) remains "1". In other words, even-number entry is assigned to the cache memory units 2a and 2c, whereas odd-number entry is assigned to the cache memory units 2b and 2d. In addition, a total of 256 entries are assigned to way "0" and way "1" by decoding address A(20:27). Like the one shown in FIG. 4, the reference numerals 26a through 26d respectively designate routes which are available for writing 16-byte instructions and data fetched to the line buffer 3 into those cache memory units 2a through 2d. While the 4-byte bus mode is underway, those 16-byte instructions and data are written into the selected cache memory units of the selected way 0 or 1. Other structures are identical to that of the preceding embodiment shown in FIG. 4, and thus, description is deleted. As mentioned above, when switching the number of entries of the cache memory units according to the difference of the width of the external buses, when the 4-byte bus mode is underway, only the select signal 30 is needed for identifying the address A(27) before selecting either those cache memory units having the odd-number entry or those cache memory units having the even-number entry. Other structures and functional operation are identical to those which are applied to the case of 8-byte bus mode.

Figure 9:
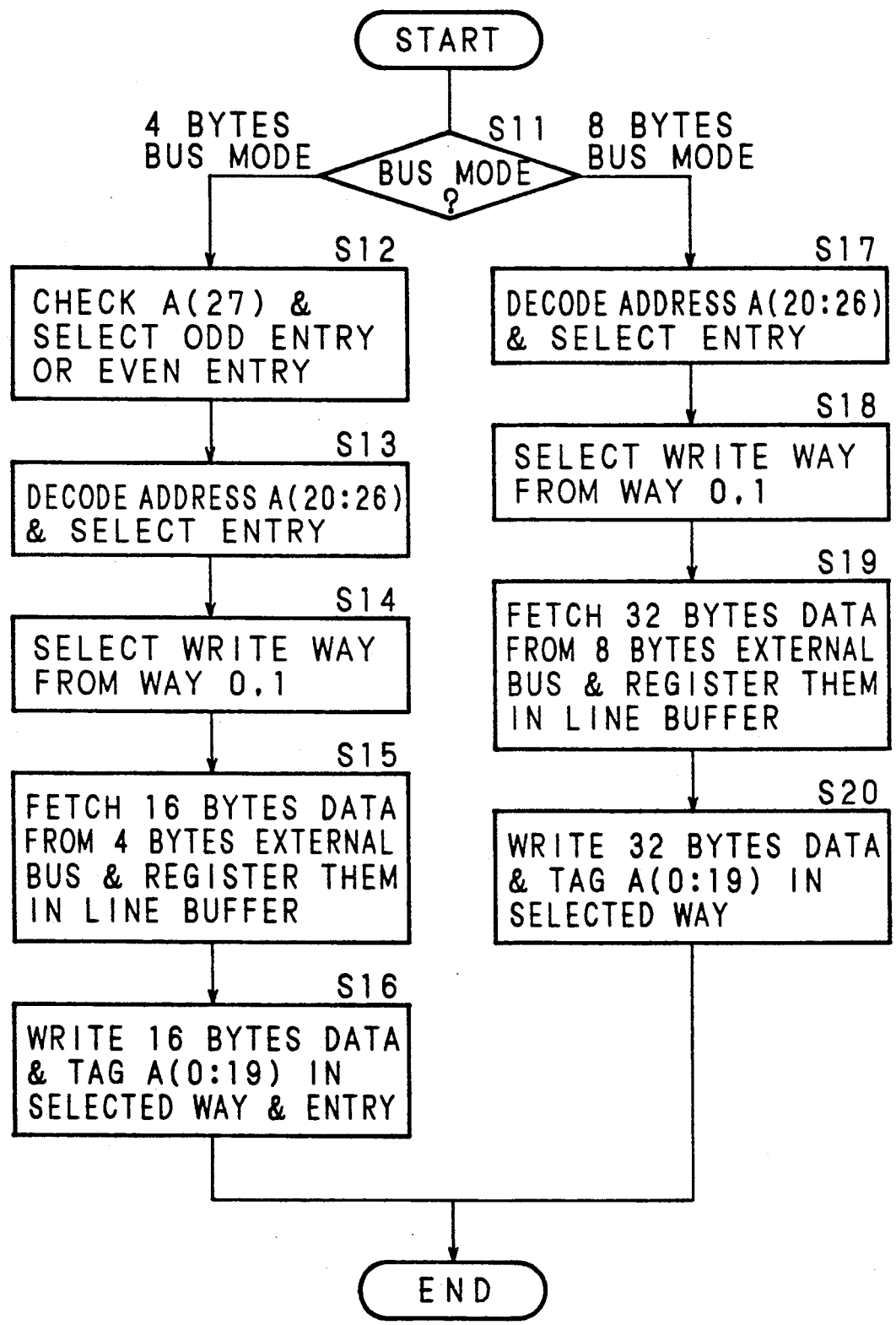
FIG. 9 designates a flowchart describing sequential operation of the microprocessor according to the above further embodiment when fetching instructions and data into own cache memory units.

Next, functional operation of the microprocessor 20 for fetching instructions and data is described below. FIG. 9 presents a flowchart describing sequential operations of the microprocessor 20 when fetching instructions and data. Since the microprocessor 20 executes those operations during steps S17 through S20 during the 8-byte bus mode like the one described in the preceding flowchart shown in FIG. 7, description of these operations is deleted here.

When the 4-byte bus mode is underway, first, step S12 is entered, in which the select signal 30 representing the state of the address A(27) output from the address control unit 32c selects either the odd-number entry or the even-number entry. Next, step S13 is entered, in which the select signal 30 decodes the address A(20:26) before selecting the specific entry. Next, step S14 is entered, in which the select signal 30 selects either way 0 or way 1 in response to the way select signal 29a or 29b output from the write way control unit 31c according to the set bus mode. Next, step S15 is entered, in which, while the block transfer operation is underway, those instructions and data of the external memory 40 from the external bus 8 having 4-byte width are solely transmitted to the upper 4-byte data bus 10a of the internal data bus 10. The 4-byte instructions and data received by the internal data bus 10 are then delivered to the corresponding regions of the upper 16 bytes and the lower 16 bytes of the line buffer 3 via the route 4. In other word, by applying the block transfer, an identical value is transmitted to the upper and lower 16 bytes of the line buffer 3 during step S15. Next, step S16 is entered, in which the upper 16-byte instructions and data are output from the line buffer 3 via the routes 26a and 26b, whereas the lower 16-byte instructions and data are output from the line buffer 3 via the routes 26c and 26d, and then these 16-byte instructions and data are respectively written into specific entries selected by the entry select signal 27 of the way 0 and way 1 selected by the way select signals 29a and 29b.

If the specified entry is of the even number, then a select signal 30="0" is output in order to select the event number entry so that those instructions and data can solely be written into the cache memory units 2a and 2c. On the other hand, if the specified entry were of the odd number, then another select signal 30="1" is output in order to select the odd-number entry so that those instructions and data can solely be written into the cache memory units 2b and 2d. When writing these instructions and data into the cache memory units 2a and 2c, the upper 16 bytes of the line buffer 3 is written. On the other hand, when writing these instructions and data into the cache memory units 2b and 2d, the lower 16 bytes of the line buffer 3 is written. By executing these processes, those tag regions, data storing regions, line buffer 3, and the write way control unit 31c outputting the way select signal, of the cache memory units 2a through 2d can be integrated into the same hardware make-up as that is available for executing the 8-byte bus mode. As described above, according to the invention, these cache memory units 2a through 2d respectively operate themselves based on 16 bytes of data width (line size) by applying two ways and 256 entries under the 4-byte bus mode and also based on 32 bytes of data width (line size) by applying two ways and 128 entries under the 8-byte bus mode.

It should be understood that the scope of those embodiments of the invention is not solely confined to those which have been described above. When operating the microprocessor embodied by the invention having a plurality of cache memory units each containing plural ways, the scope of the invention is also applicable to such a case in which the write line size of the cache memory units is brought into perfect accord with the byte number of memory and data fetched from an external bus having wide bus width. Conversely when fetching those instructions and data from another external bus having narrow bus width, the accord between the write line size of the cache memory units and the byte number of memory and data can be achieved by increasing the number of entries based on the division of the data width (line size). For example, while the 4-byte bus mode is underway, all the cache memory units are operated based on 16 bytes of the line size by applying four ways and 128 entries. On the other hand, when the 8-byte bus mode is present, all the cache memory units are operated based on 32 bytes of the line size by applying four ways and 64 entries.

As is clear from the above description, according to the first and second embodiments of the invention, the microprocessor having a plurality of widths of external buses and a plurality of built-in cache memory units having plural ways properly switches the number of ways or entries of each cache memory unit in accordance with the width of the external buses. As a result, unlike any conventional microprocessor which causes the data storing region of each cache memory unit to generate unused portion while the 4-byte bus mode is underway, the microprocessor according to the invention fully eliminates the unused portion of the data storing region of each cache memory unit by bringing the byte number of the fetched instructions and data into perfect accord with the data width (line size) to be written into the cache memory units. This in turn fully promotes the efficiency of the use of the entire cache memory units, and yet, allows the microprocessor to fully write instructions and data into the specified cache memory units merely by executing a single round of the block transfer operation, thus making it possible for the microprocessor to complete the block transfer operation in an extremely short period of time and at a very fast speed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. In a microprocessor having an address bus and a data bus for communicating with an external memory, a cache architecture comprising:

a plurality of configurable cache memory units, coupled to the data bus; and organized to store data fetched from the external memory according to way set-associative mapping including an index field, a tag field and a way set; and means, coupled to receive from the microprocessor a bus mode signal indicating a data bus width, for varying a number of way sets of said configurable cache memory units associated with the index field according to a value of said bus mode signal.

2. The cache architecture of claim 1, further comprising an access means, coupled to said bus mode signal and to said configurable cache memory units, for accessing said configurable cache memory units using n way set associative mapping wherein n is the number of way sets established by said means for varying.

3. A cache architecture as set forth in claim 1, wherein said data bus further includes a first data bus width having 4-byte width and a second data bus width having 8-byte width, and wherein said means for varying switches, when the bus mode signal indicates use of said first data bus width, the number of way sets associated with the index field to a first number, wherein the first number is twice a second number of way sets associated with the index field when the said bus mode signal indicates use of said second data bus width.

4. A microprocessor as set forth in claim 3, further comprising:
an access means, coupled to said bus mode signal and to said plurality of configurable cache memory units for accessing data from said configurable cache memory; and
wherein when said bus mode signal indicates use of said first bus width, said access means accesses said configurable cache memory units using four-way set associative form, and when said bus mode signal indicates use of said second bus width, said access means accesses said configurable cache memory units using on two-way set associative form.

5. In a microprocessor having an address bus and a data bus for communication with an external memory, a cache architecture comprising:
a plurality of configurable cache memory units coupled to the data bus, and organized to store data fetched from the external memory according to way-set associative mapping including an index field, a tag field and a way-set; and
means, coupled to receive from the microprocessor, a bit mode signal indicating a data bus width, for switching a number of index fields of said configurable cache memory units associated with the way set according to a value of the bus mode signal.

6. The cache architecture of claim 5, further comprising an access means, coupled to said bus mode signal and to said configurable cache memory units for accessing said cache memory units.

7. The cache architecture as set forth in claim 5, wherein said data bus includes a first data bus width having 4-byte width and a second data bus width having 8-byte width, and wherein
said means for varying switches, when the bus mode signal indicates use of said first data bus width, to a first number of index fields, and wherein said first number is double a second number of index fields available when the bus mode signal indicates use of said second data bus width.

8. The cache architecture, as set forth in claim 7, wherein said plurality of configurable cache memory units are respectively provided with a total of 256 entries; and
wherein said access means accesses said configurable cache memory units using two-way-set associative form and said 256 entries when the mode signal indicates use of said first data bus width and using two-way set associative form and 128 entries when the bus mode signal indicates use of said second data bus width.

9. In a microprocessor having an address bus and a data bus for communicating with an external memory, a cache architecture comprising:
a plurality of configurable cache memory units, coupled to the data bus, and arranged to have plural sets of memory arrays including a tag field and a data field, wherein each of said plural sets of memory arrays are addressed with a single given index address whereby said memory arrays have plural way set associativity; and
means, coupled to receive from the microprocessor a bus mode signal indicating a data bus width, for varying a number of way sets of said configurable cache memory units associated with the index field according to a value of said bus mode signal.

* * * * *